United States Patent
Dai et al.

(10) Patent No.: US 10,554,330 B2
(45) Date of Patent: Feb. 4, 2020

(54) SPATIAL LAYERED TRANSMISSION METHOD AND DEVICE

(71) Applicant: CHINA ACADEMY OF TELECOMMUNICATIONS TECHNOLOGY, Beijing (CN)

(72) Inventors: Xiaoming Dai, Beijing (CN); Shaoli Kang, Beijing (CN); Shaohui Sun, Beijing (CN); Xi Meng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 215 days.

(21) Appl. No.: 15/532,992

(22) PCT Filed: Dec. 21, 2015

(86) PCT No.: PCT/CN2015/098106
§ 371 (c)(1),
(2) Date: Jun. 2, 2017

(87) PCT Pub. No.: WO2016/107441
PCT Pub. Date: Jul. 7, 2016

(65) Prior Publication Data
US 2017/0373791 A1    Dec. 28, 2017

(30) Foreign Application Priority Data

Dec. 29, 2014 (CN) .......................... 2014 1 0848868

(51) Int. Cl.
*H04L 1/00* (2006.01)
*H04L 1/06* (2006.01)

(52) U.S. Cl.
CPC .......... *H04L 1/0013* (2013.01); *H04L 1/0618* (2013.01)

(58) Field of Classification Search
CPC ........ H04L 1/0061; H04L 5/006; H04L 43/16
See application file for complete search history.

(56) References Cited

U.S. PATENT DOCUMENTS 6,798,838 B1 *  9/2004  Ngo ..................... H04L 1/0003
                                                        375/240.19
2004/0196919 A1   10/2004  Mehta et al.
(Continued)

FOREIGN PATENT DOCUMENTS

CN          1366770 A        8/2002
CN        102195759 A        9/2011
(Continued)

OTHER PUBLICATIONS

International Search Report for PCT/CN2015/098106 dated Mar. 21, 2016 and its English translation provided by WIPO.
(Continued)

*Primary Examiner* — Romani Ohri
(74) *Attorney, Agent, or Firm* — Ladas & Parry, LLP

(57) ABSTRACT

The present application provides a spatial layered transmission method and a spatial layered transmission device. The spatial layered transmission method includes steps of: dividing to-be-transmitted data into at least two layers of spatial data; determining a symbol rate for each layer of spatial data, to enable an error between SERs for the layers of spatial data to be smaller than a predetermined error threshold; and encoding each layer of spatial data in accordance with the determined symbol rate, and transmitting the encoded layer of spatial data.

8 Claims, 5 Drawing Sheets

(56) References Cited

U.S. PATENT DOCUMENTS

| | | |
|---|---|---|
| 2004/0204104 A1 | 10/2004 | Horng et al. |
| 2006/0205357 A1 | 9/2006 | Kim |
| 2008/0304468 A1 | 12/2008 | Sun |
| 2011/0182337 A1 | 7/2011 | Taoka et al. |
| 2011/0268176 A1* | 11/2011 | Jeong .................... H04L 1/0001 375/240.01 |
| 2013/0083835 A1* | 4/2013 | Gupta .................. H04B 7/0417 375/227 |
| 2013/0106998 A1 | 5/2013 | Pahalawatta et al. |
| 2013/0343446 A1* | 12/2013 | Eliaz .................. H04L 27/2628 375/230 |
| 2015/0223074 A1* | 8/2015 | Prytz .................... H04W 16/14 370/235 |

FOREIGN PATENT DOCUMENTS

| | | | |
|---|---|---|---|
| CN | 102739363 A | | 10/2012 |
| JP | 2005535221 A | | 11/2005 |
| JP | 2008533872 A | | 8/2008 |
| JP | 2009518928 A | | 5/2009 |
| JP | 2010004517 A | | 1/2010 |
| WO | 2007/066307 A2 | | 6/2007 |
| WO | 2011136575 A2 | | 11/2011 |
| WO | 2012006299 A1 | | 1/2012 |

OTHER PUBLICATIONS

Written Opinion of the International Search Authority for PCT/CN2015/098106 dated Mar. 21, 2016 and its English translation provided by WIPO.

International Preliminary Report on Patentability (IPRP; Ch. 1) for PCT/CN2015/098106 dated Jul. 13, 2017 and its English translation provided by WIPO.

From EPO Application No. 15875119.8, Extended European Search Report and Search Opinion dated Nov. 29, 2017.

Xu et al.: "Joint Multi-Layer Multi-Rate Code and Quasi-Orthogonal Space-Time Code Scheme with Good Diversity-Multiplexing Tradeoffs"; $9^{th}$ International Conference on Communications and Networking in China; Aug. 14, 2014; pp. 266-270.

From JP Application No. 2017-530176, Office Action dated Apr. 17, 2018 with English translation from Global Dossier.

* cited by examiner

SPATIAL LAYERED TRANSMISSION METHOD AND DEVICE

CROSS-REFERENCE TO RELATED APPLICATIONS

The present application is the U.S. national phase of PCT Application No. PCT/CN2015/098106 filed on Dec. 21, 2015, which claims a the priority of to the Chinese patent application No. 201410848868.7 filed on Dec. 29, 2014 and entitled "spatial layered transmission method and device", the disclosures of which are incorporated herein by reference in their entireties.

TECHNICAL FIELD

The present disclosure relates to the field of communication technology, in particular to a spatial layered transmission method and a spatial layered transmission device.

BACKGROUND

A Quasi-Orthogonal Space-Time Block Code (QO-STBC) transmission scheme based on a Bit Interleaved Coded Modulation (BICM) structure may be adopted by a conventional Multiple Input Multiple Output (MIMO) system. Through the QO-STBC, it is able to make a compromise between diversity and multiplexing. In addition, it is able for a specially-designed QO-STBC to achieve transmission in a spatial layered mode. The spatial layered mode is suitable for a Successive Interference Cancellation (SIC)-based receiver algorithm, and it has excellent performance even for linear detection with low complexity (e.g., a Zero Forcing (ZF) algorithm or Minimum Mean Square Error (MMSE) algorithm). To be specific, a data stream is divided into a plurality of spatial data layers, data in each layer has an identical post-detection diversity order, and data in all the layers also has an approximately identical post-detection diversity order, so as to achieve an overall excellent performance.

Through the coarse tuning of the diversity order of the data in each layer, it is able for the QO-STBC transmission scheme to achieve the excellent overall performance. However, due to such factors as non-ideal SIC, there is a difference in post-detection symbol error rates (SERs) for the data streams in the layers, resulting in performance losses.

SUMMARY

An object of the present disclosure is to provide a spatial layered transmission method and a spatial layered transmission device, so as to prevent the performance losses due to the difference in the post-detection SERs for the data stream in the layers in the case that the QO-STBC transmission scheme is adopted.

In one aspect, the present disclosure provides in some embodiments a spatial layered transmission method, including steps of: dividing to-be-transmitted data into at least two layers of spatial data; determining a symbol rate for each layer of spatial data, so as to enable an error between SERs for the layers of spatial data to be smaller than a predetermined error threshold; and encoding each layer of spatial data in accordance with the determined symbol rate, and transmitting the encoded layer of spatial data.

Preferably, the symbol rates for the layers of spatial data are different from each other, so as to provide different levels of error protection for different spatial data streams.

Preferably, the step of determining the symbol rate for each layer of spatial data includes: determining the symbol rate for each layer of spatial data in accordance with an equivalent error probability criterion.

Preferably, the step of determining the symbol rate for each layer of spatial data in accordance with the equivalent error probability criterion includes: determining the symbol rate for each layer of spatial data through simulation in the case that a predetermined symbol rate constraint has been met.

In another aspect, the present disclosure provides in some embodiments a spatial layered transmission method, including steps of: receiving layers of spatial data, a symbol rate for each layer of spatial data being set by a transmitting end so as to enable an error between SERs for the layers of spatial data to be smaller than a predetermined error threshold; decoding the layers of spatial data; and acquiring data transmitted from the transmitting end in accordance with the decoded layers of spatial data.

Preferably, the symbol rates for the layers of spatial data are different from each other, so as to provide different levels of error protection for different spatial data streams.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

In yet another aspect, based on a similar concept as that of the above method, the present disclosure provides in some embodiments a spatial layered transmission device, including: a spatial division module configured to divide to-be-transmitted data into at least two layers of spatial data; a symbol rate determination module configured to determine a symbol rate for each layer of spatial data, so as to enable an error between SERs for the layers of spatial data to be smaller than a predetermined error threshold; and a data transmission module configured to encode each layer of spatial data in accordance with the determined symbol rate, and transmit the encoded layer of spatial data.

Preferably, the symbol rates for the layers of spatial data are different from each other, so as to provide different levels of error protection for different spatial data streams.

Preferably, the symbol rate determination module is further configured to determine the symbol rate for each layer of spatial data in accordance with an equivalent error probability criterion.

Preferably, the symbol rate determination module is further configured to determine the symbol rate for each layer of spatial data through simulation in the case that a predetermined symbol rate constraint has been met.

In still yet another aspect, based on a similar concept as that of the above method, the present disclosure provides in some embodiments a base station, including a processor, a memory and a transceiver. The processor is configured to read a program stored in the memory, so as to divide to-be-transmitted data into at least two layers of spatial data, determine a symbol rate for each layer of spatial data so as to enable an error between SERs for the layers of spatial data to be smaller than a predetermined error threshold, encode each layer of spatial data in accordance with the determined symbol rate, and transmit the encoded layer of spatial data through the transceiver. The transceiver is configured to receive and transmit data under the control of the processor. The memory is configured to store therein data for the operation of the processor.

Preferably, the symbol rates for the layers of spatial data are different from each other, so as to provide different levels of error protection for different spatial data streams.

Preferably, the processor is further configured to determine the symbol rate for each layer of spatial data in accordance with an equivalent error probability criterion.

Preferably, the processor is further configured to determine the symbol rate for each layer of spatial data through simulation in the case that a predetermined symbol rate constraint has been met.

In still yet another aspect, based on a similar concept as that of the above method, the present disclosure provides in some embodiments a spatial layered transmission device, including: a data reception module configured to receive layers of spatial data, a symbol rate for each layer of spatial data being set by a transmitting end so as to enable an error between SERs for the layers of spatial data to be smaller than a predetermined error threshold; a decoding module configured to decode the layers of spatial data; and a data acquisition module configured to acquire data transmitted from the transmitting end in accordance with the decoded layers of spatial data.

Preferably, the symbol rates for the layers of spatial data are different from each other, so as to provide different levels of error protection for different spatial data streams.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

In still yet another aspect, based on a similar concept as that of the above method, the present disclosure provides in some embodiments a User Equipment (UE), including a processor, a memory and a transceiver. The processor is configured to read a program stored in the memory, so as to: receive layers of spatial data through the transceiver, a symbol rate for each layer of spatial data being set by a transmitting end so as to enable an error between SERs for the layers of spatial data to be smaller than a predetermined error threshold, decode the layers of spatial data; and acquire data transmitted from the transmitting end in accordance with the decoded layers of spatial data. The transceiver is configured to receive and transmit data under the control of the processor. The memory is configured to store therein data for the operation of the processor.

Preferably, the symbol rates for the layers of spatial data are different from each other, so as to provide different levels of error protection for different spatial data streams.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

According to the methods and devices in the embodiments of the present disclosure, the symbol rate for each layer of spatial data may be determined in such a manner that the error between the post-detection SERs for the layers of spatial data is smaller than the predetermined error threshold. As a result, it is able to provide different error-correction encoding schemes with different levels of protection for the layers of spatial data, balance the SERs for the layers of spatial data and provide the layers of spatial data with approximately uniform transmission performance, thereby to improve the system performance.

DETAILED DESCRIPTION OF THE EMBODIMENTS

The present disclosure will be described in details hereinafter in conjunction with the drawings and embodiments.

Figure 1:
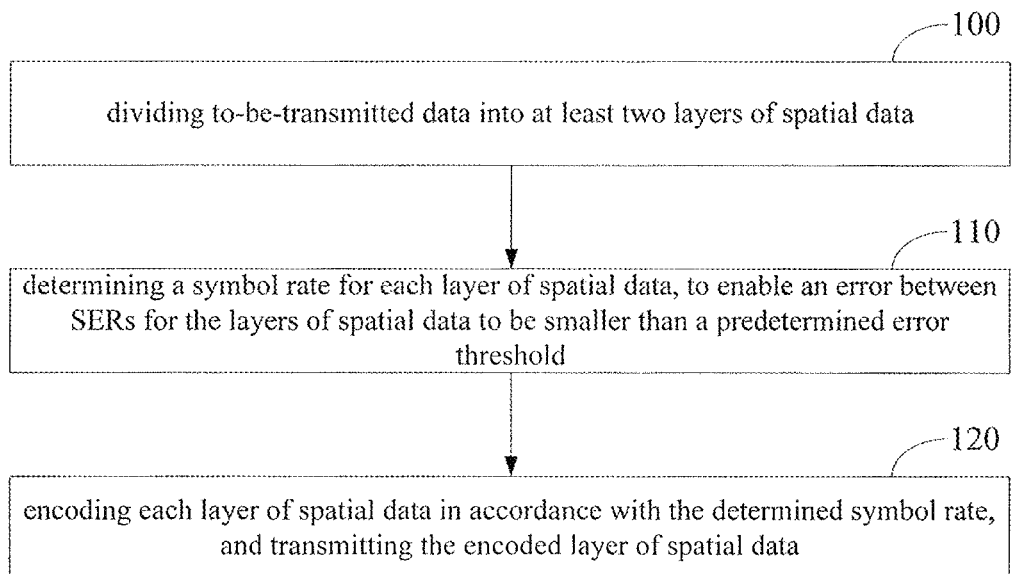
FIG. 1 is a flow chart of a spatial layered transmission method at a transmitting end according to one embodiment of the present disclosure.

As shown in FIG. 1, the present disclosure provides in some embodiments a spatial layered transmission method at a transmitting end, including: Step 100 of dividing to-be-transmitted data into at least two layers of spatial data; Step 110 of determining a symbol rate for each layer of spatial data, to enable an error between SERs for the layers of spatial data to be smaller than a predetermined error threshold; and Step 120 of encoding each layer of spatial data in accordance with the determined symbol rate, and transmitting the encoded layer of spatial data. In the embodiments of the present disclosure, the SER for the spatial data refers to a post-detection SER for the spatial data.

According to the method in the embodiments of the present disclosure, the symbol rate for each layer of spatial data may be determined in such a manner that the error between the post-detection SERs for the layers of spatial data is smaller than the predetermined error threshold. As a result, it is able to provide different error-correction encoding schemes with different levels of protection for the layers of spatial data, balance the SERs for the layers of spatial data and provide the layers of spatial data with approximately uniform transmission performance, thereby to improve the system performance.

In a possible embodiment of the present disclosure, preferably, the symbol rates for the layers of spatial data are different from each other, so as to provide different levels of error protection for different spatial data streams.

In the embodiments of the present disclosure, the symbol rate for each layer of spatial data may be determined in various ways, as long as an error between the post-detection SERs for the layers of spatial data is smaller than the predetermined error threshold. Preferably, the symbol rate for each layer of spatial data may be determined in accordance with an equivalent error probability criterion.

The equivalent error probability criterion refers to a principle where the post-detection SERs are approximately equal to each other. To be specific, based on this criterion, the symbol rate for each layer of spatial data may be determined through simulation in the case that a predetermined symbol rate constraint has been met.

Figure 2:
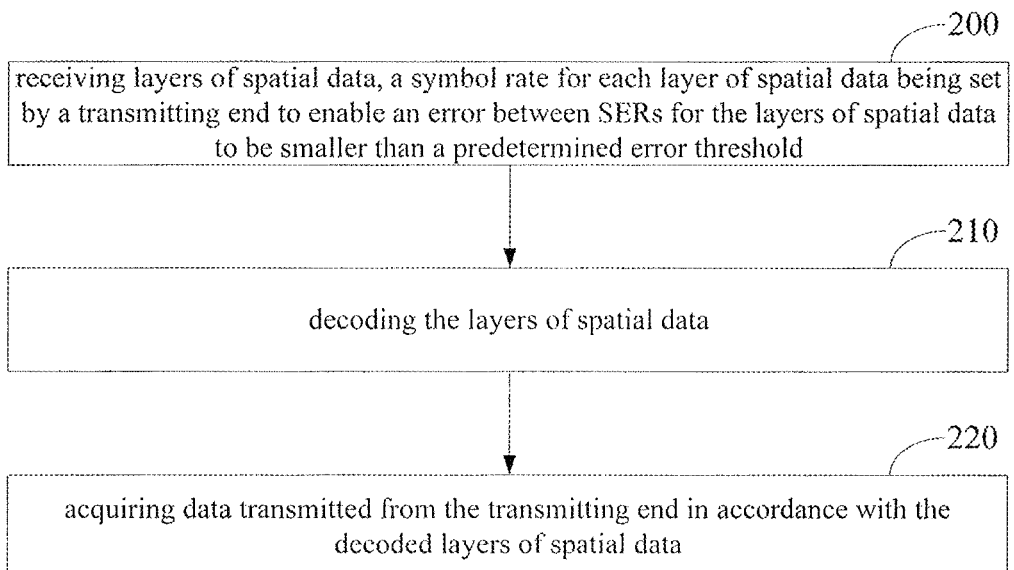
FIG. 2 is a flow chart of a spatial layered transmission method at a receiving end according to one embodiment of the present disclosure.

As shown in FIG. 2, the present disclosure further provides in some embodiments a spatial layered transmission method at a receiving end, including: Step 200 of receiving layers of spatial data, a symbol rate for each layer of spatial data being set by a transmitting end so as to enable an error between SERs for the layers of spatial data to be smaller than a predetermined error threshold; Step 210 of decoding the layers of spatial data; and Step 220 of acquiring data transmitted from the transmitting end in accordance with the decoded layers of spatial data.

In the embodiments of the present disclosure, the symbol rate for each layer of spatial data is determined so as to enable the error between the SERs for the layers of spatial data to be smaller than the predetermined error threshold, so the error of each decoded layer of spatial data is smaller than the predetermined error threshold. As a result, it is able to improve the system performance.

Preferably, the symbol rates for the layers of spatial data are different from each other.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

The technical solution is provided in the embodiments of the present disclosure for a SIC receiver.

Figure 3:
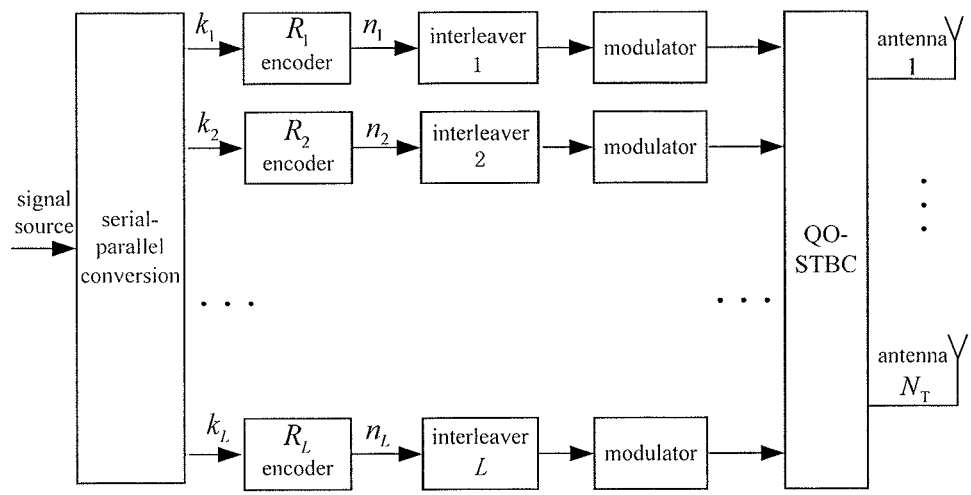
FIG. 3 is another flow chart of the spatial layered transmission method at the transmitting end according to one embodiment of the present disclosure.
Figure 4:
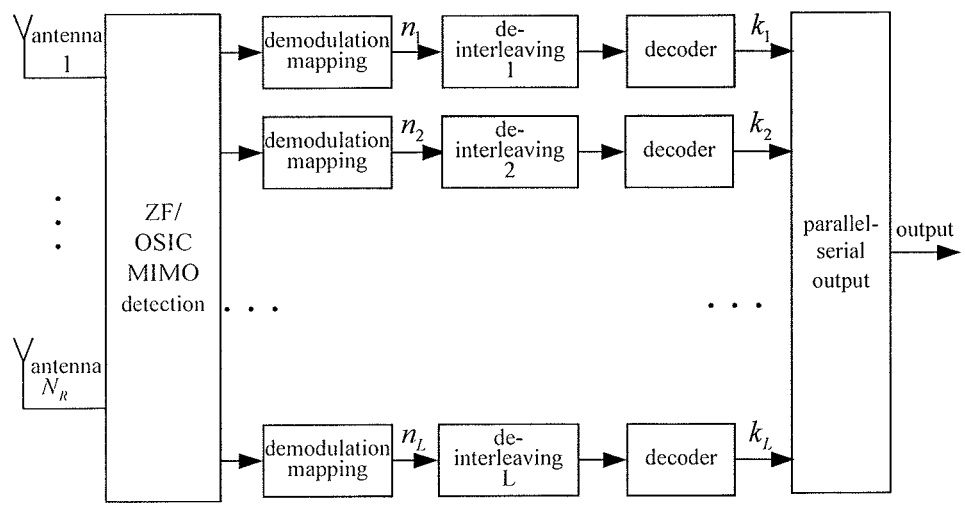
FIG. 4 is another flow chart of the spatial layered transmission method at the receiving end according to one embodiment of the present disclosure.

Taking an MIMO system using the technical solution provided in the embodiments of the present disclosure as an example, FIG. 3 shows a transmission procedure at the transmitting end, and FIG. 4 shows a transmission procedure at the receiving end, where L represents the number of turbo encoders, $k_i$ represents the number of signal sources, $n_i$ represents a length of a turbo code, and $1 \leq i \leq L$. For the symbol rates, $R_1 > R_2 >, \ldots, > R_L$.

Taking three-antenna and four-antenna systems as examples, to-be-transmitted code words are $G_3$ and $G_4$ respectively.

Principles for the $G_3$-based three-antenna system and the $G_4$-based four-antenna system may be shown by the following two equations:

$$G_3 = \begin{bmatrix} s_1 & s_2^* & s_5 \\ s_2 & -s_1^* & s_3 \\ s_4 & s_3^* & s_1 \end{bmatrix}, \text{ and } G_4 = \begin{bmatrix} s_1 & s_2^* & s_5 & s_8^* \\ s_2 & -s_1^* & s_3 & s_6^* \\ s_5 & s_3^* & s_1 & s_4^* \\ s_7 & s_6^* & s_4 & -s_1^* \end{bmatrix}.$$

In the case that three antennae are adopted at the transmitting end and the receiving end (i.e., $N_T=3$ and $N_R=3$) and the code word $G_3$ is taken as a transmission matrix, signals received at the received end may be expressed as follows:

$$\begin{bmatrix} y_{11} & y_{12} & y_{13} \\ y_{21} & y_{22} & y_{23} \\ y_{31} & y_{32} & y_{33} \end{bmatrix} =$$

$$\sqrt{\frac{\rho}{3}} \begin{bmatrix} h_{11} & h_{12} & h_{13} \\ h_{21} & h_{22} & h_{23} \\ h_{31} & h_{32} & h_{33} \end{bmatrix} \begin{bmatrix} x_1 & x_2^* & x_4 \\ x_2 & -x_1^* & x_3 \\ x_4 & x_3^* & x_1 \end{bmatrix} + \begin{bmatrix} v_{1,1} & v_{1,2} & v_{1,3} \\ v_{2,1} & v_{2,2} & v_{2,3} \\ v_{3,1} & v_{3,2} & v_{3,3} \end{bmatrix}, \text{ and}$$

equivalently, $$\begin{bmatrix} y_{1,1} \\ y_{2,1} \\ y_{3,1} \\ y_{1,2}^* \\ y_{2,2}^* \\ y_{3,2}^* \\ y_{1,3} \\ y_{2,3} \\ y_{3,3} \end{bmatrix} = \sqrt{\frac{\rho}{3}} \underbrace{\begin{bmatrix} h_{1,1} & h_{1,2} & 0 & h_{1,3} & 0 \\ h_{2,1} & h_{2,2} & 0 & h_{2,3} & 0 \\ h_{3,1} & h_{3,2} & 0 & h_{3,3} & 0 \\ -h_{1,2}^* & h_{1,1}^* & h_{1,3}^* & 0 & 0 \\ -h_{2,2}^* & h_{2,1}^* & h_{2,3}^* & 0 & 0 \\ -h_{3,2}^* & h_{3,1}^* & h_{3,3}^* & 0 & 0 \\ h_{1,3} & 0 & h_{1,2} & 0 & h_{1,1} \\ h_{2,3} & 0 & h_{2,2} & 0 & h_{2,1} \\ h_{3,3} & 0 & h_{3,2} & 0 & h_{3,1} \end{bmatrix}}_{\triangleq H_{equivalent}} \begin{bmatrix} x_1 \\ x_2 \\ x_3 \\ x_4 \\ x_5 \end{bmatrix} + \begin{bmatrix} v_{1,1} \\ v_{2,1} \\ v_{3,1} \\ v_{1,2}^* \\ v_{2,2}^* \\ v_{3,2}^* \\ v_{1,3} \\ v_{2,3} \\ v_{3,3} \end{bmatrix}.$$

Identically, in the case that four antennae are adopted at the transmitting end and the receiving end (i.e., $N_T=4$ and $N_R=4$), an equivalent channel matrix for $G_4$ may be expressed as:

$$\begin{bmatrix} y_{11} \\ y_{21} \\ y_{31} \\ y_{41} \\ y_{12}^* \\ y_{22}^* \\ y_{32}^* \\ y_{42}^* \\ y_{13} \\ y_{23} \\ y_{33} \\ y_{43} \\ y_{14}^* \\ y_{24}^* \\ y_{34}^* \\ y_{44}^* \end{bmatrix} = \sqrt{\frac{\rho}{4}} \underbrace{\begin{bmatrix} h_{11} & h_{12} & 0 & 0 & h_{13} & 0 & h_{14} & 0 \\ h_{21} & h_{22} & 0 & 0 & h_{23} & 0 & h_{24} & 0 \\ h_{31} & h_{32} & 0 & 0 & h_{33} & 0 & h_{34} & 0 \\ h_{41} & h_{42} & 0 & 0 & h_{43} & 0 & h_{44} & 0 \\ -h_{12}^* & h_{11}^* & h_{13}^* & 0 & 0 & h_{14}^* & 0 & 0 \\ -h_{22}^* & h_{21}^* & h_{23}^* & 0 & 0 & h_{24}^* & 0 & 0 \\ -h_{32}^* & h_{31}^* & h_{33}^* & 0 & 0 & h_{34}^* & 0 & 0 \\ -h_{42}^* & h_{41}^* & h_{43}^* & 0 & 0 & h_{44}^* & 0 & 0 \\ h_{13} & 0 & h_{12} & h_{14} & h_{11} & 0 & 0 & 0 \\ h_{23} & 0 & h_{22} & h_{24} & h_{21} & 0 & 0 & 0 \\ h_{33} & 0 & h_{32} & h_{34} & h_{31} & 0 & 0 & 0 \\ h_{43} & 0 & h_{42} & h_{44} & h_{41} & 0 & 0 & 0 \\ -h_{14}^* & 0 & h_{13}^* & h_{12}^* & 0 & h_{11}^* & 0 & 0 \\ -h_{24}^* & 0 & h_{23}^* & h_{22}^* & 0 & h_{21}^* & 0 & 0 \\ -h_{34}^* & 0 & h_{33}^* & h_{32}^* & 0 & h_{31}^* & 0 & 0 \\ -h_{44}^* & 0 & h_{43}^* & h_{42}^* & 0 & h_{41}^* & 0 & 0 \end{bmatrix}}_{\triangleq H_{equivalent}} \begin{bmatrix} x_1 \\ x_2 \\ x_3 \\ x_4 \\ x_5 \\ x_6 \\ x_7 \\ x_8 \end{bmatrix} + \begin{bmatrix} v_{11} \\ v_{21} \\ v_{31} \\ v_{41} \\ v_{12}^* \\ v_{22}^* \\ v_{32}^* \\ v_{42}^* \\ v_{13} \\ v_{23} \\ v_{33} \\ v_{43} \\ v_{14}^* \\ v_{24}^* \\ v_{34}^* \\ v_{44}^* \end{bmatrix}.$$

Obviously, for any MIMO system where $N_R \geq R_G$, the similar equivalent channel matrices for $G_3$ and $G_4$ may be acquired. Then, a ZF algorithm using a Vertical Bell Labs Layered Space-Time (V-BLAST) structure or an Ordered Successive Interference Cancellation (OSIC) algorithm may be used to perform the detection.

Wireless channels between the transmitting antennae and corresponding receiving antennae are independent of each other, and they may obey flat Rayleigh fading. A channel fading coefficient may obey independently and identically complex Gaussian random distribution having a mean value of 0 and a variance of 1, in the case that the receiving end knows all Channel State Information (CSI).

Figure 5:
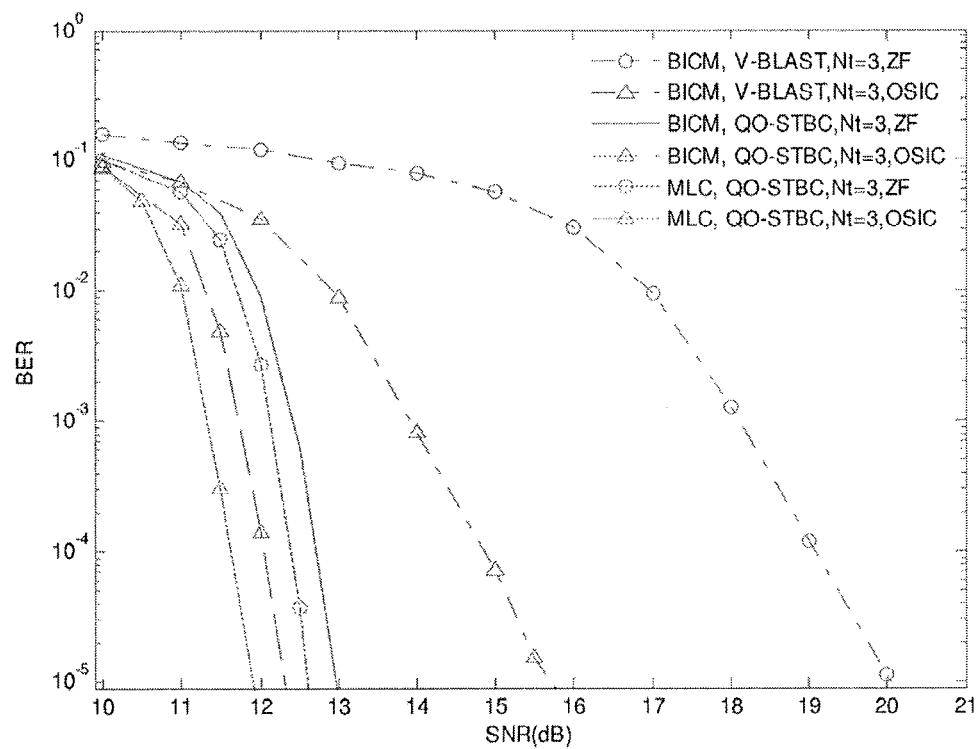
FIG. 5 is a curve diagram of Bit Error Rate (BER) performance for a 3-antenna system.
Figure 6:
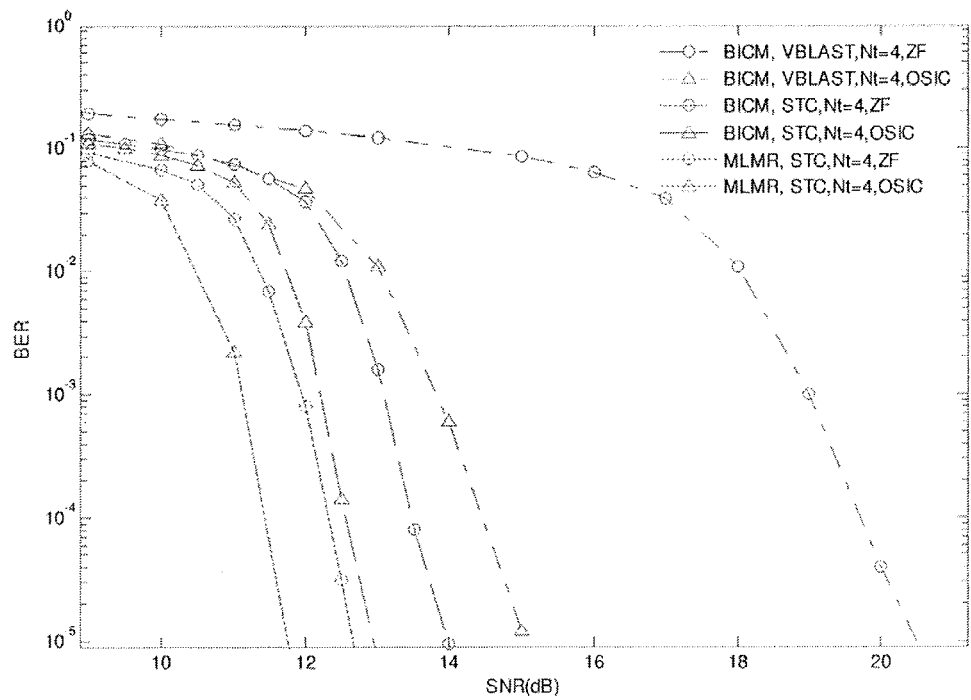
FIG. 6 is a curve diagram of BER performance for a 4-antenna system.

FIG. 5 is a curve diagram of the BER performance for the space-time transmission code word $G_3$ as the transmission matrix based on 16-Quadrature Amplitude Modulation (QAM), wherein a Multi-Level Coding (MLC) structure and a BICM structure are adopted. In addition, it is compared with the performance of a V-BLAST system having the BICM structure and using Quadrature Phase Shift Keying (QPSK) modulation. A channel encoding symbol rate used by the V-BLAST system is 0.75. For the QO-STBC system having the MLC structure and using $G_3$ as the transmission matrix, three parallel turbo codes are used for protecting each layer of data by channel coding. Based on a symbol rate selection criterion for MLC encoding, $R_1=0.84$, $R_2=0.7375$, $R_3=0.53$, and an equivalent symbol rate is $R_c=0.675$. The QO-STBC system having the BICM structure may use a turbo encoder having a symbol rate of 0.675. The three schemes may have an identical spectrum efficiency, i.e., $5/3*4*0.675=3*2*0.75=4.5$ bit/s/Hz. As shown in FIG. 6, in the case that an OSIC-based receiver is used and a BER is $1\times10^{-5}$, the MLC structure may acquire a gain of about 0.5 dB as compared with the BICM structure, and the transmitting scheme of the present disclosure may acquire a gain of about 3.9 dB as compared with the V-BLAST system. In the case that a Zero Forcing-Linear Detection (ZF-LD) receiver is used and the BER is $1\times10^{-5}$, the MLC structure may acquire a gain of about 0.5 dB as compared with the BICM structure, and it may acquire a gain up to 7.3 dB as compared with the V-BLAST system.

In the case that four antennae are adopted by both the transmitting end and the receiving end, the QO-STBC system may use the code word transmission matrix $G_4$ based on 16-QAM. For the MLC structure, three parallel turbo encoders are used for protecting each layer of data by channel coding, $R_1=0.94$, $R_2=0.81$, $R=0.58$, and an equivalent symbol rate is $R_c=0.75$. The QO-STBC transmitting structure having the BICM may use a turbo encoder having a fixed symbol rate of $R_c=0.75$ The V-BLAST system with the BICM structure uses the QPSK modulation and turbo encoder with the symbol rate of 0.75. The three schemes may have an identical system spectrum efficiency, i.e., $8/4*4*0.75=4*2*0.75=6$ bit/s/Hz. As shown in FIG. 6, in the case that an OSIC-based receiver is used and a BER is $1\times10^{-5}$, the MLC structure may acquire a performance gain of about 1.2 dB as compared with the BICM structure, and the system having the MLC structure and using $G_4$ may acquire a gain of about 3.2 dB as compared with the V-BLAST system. In the case that a ZF-LD receiver is used and the BER is $1\times10^{-5}$, the MLC system using the code word $G_4$ may acquire a performance gain of 1.3 dB as compared with the QO-STBC system having the BICM structure, and may acquire a performance gain up to 7.8 dB as compared with the V-BLAST system having the BICM structure. At a high Signal-to-Noise Ratio (SNR) region, the QO-STBC system based on the ZF linear receiver and having the MLC structure may have the performance even better than the QO-STBC system based on the SIC receiver and having the BICM structure. As a result, for the QO-STBC system having the MLC structure in the embodiments of the present disclosure, it is able to provide a less complex receiver, and acquire more gain as compared with the BICM system and the V-BLAST system.

Figure 7:
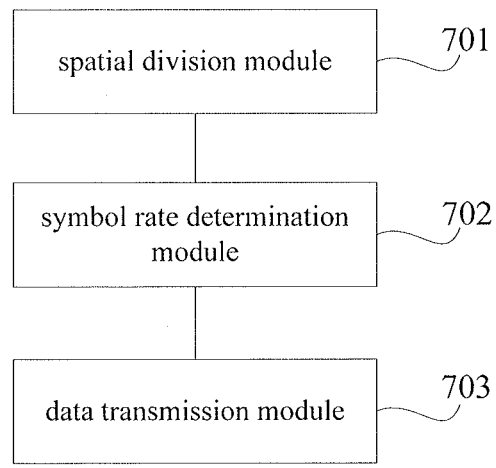
FIG. 7 is a schematic view showing a spatial layered transmission device according to one embodiment of the present disclosure.

Based on an identical inventive concept, the present disclosure further provides in some embodiments a spatial layered transmission device which, as shown in FIG. 7, includes: a spatial division module 701 configured to divide to-be-transmitted data into at least two layers of spatial data; a symbol rate determination module 702 configured to determine a symbol rate for each layer of spatial data, so as to enable an error between SERs for the layers of spatial data to be smaller than a predetermined error threshold; and a data transmission module 703 configured to encode each layer of spatial data in accordance with the determined symbol rate, and transmit the encoded layer of spatial data.

Preferably, the symbol rates for the layers of spatial data are different from each other.

Preferably, the symbol rate determination module 702 is further configured to determine the symbol rate for each layer of spatial data in accordance with an equivalent error probability criterion.

Preferably, the symbol rate determination module 702 is further configured to determine the symbol rate for each layer of spatial data through simulation in the case that a predetermined symbol rate constraint has been met.

Figure 8:
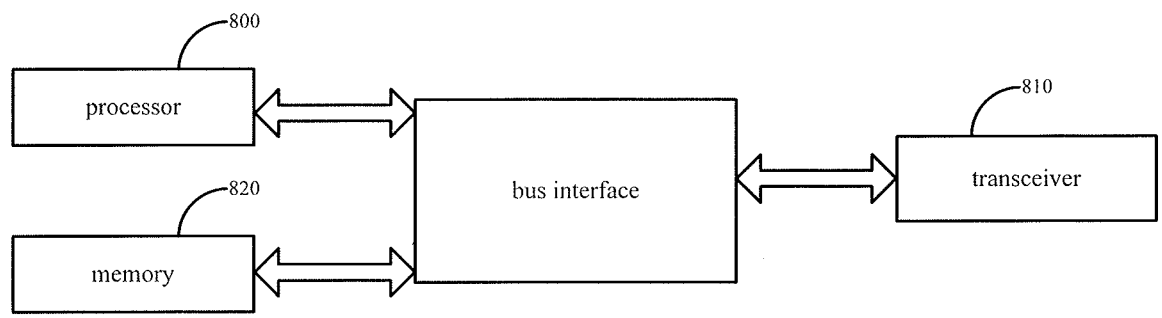
FIG. 8 is a schematic view showing a base station according to one embodiment of the present disclosure.

Based on an identical inventive concept, the present disclosure further provides a base station which, as shown in FIG. 8, includes a processor 800, a memory 820 and a transceiver 810. The processor 800 is configured to read a program stored in the memory 820, so as to divide to-be-transmitted data into at least two layers of spatial data, determine a symbol rate for each layer of spatial data so as to enable an error between SERs for the layers of spatial data to be smaller than a predetermined error threshold, encode each layer of spatial data in accordance with the determined symbol rate, and transmit the encoded layer of spatial data through the transceiver 810. The transceiver 810 is configured to receive and transmit data under the control of the processor 800.

In FIG. 8, a bus architecture may include a number of buses and bridges connected to each other, so as to connect various circuits for one or more processors such as the processor 800, one or more memories such as the memory 820, and etc. In addition, as is known in the art, the bus architecture may be used to connect various other circuits, such as a circuit for a peripheral device, a circuit for a voltage stabilizer and a power management circuit. Bus interfaces are provided, and the transceiver 810 may consist of a plurality of elements, i.e., a transmitter and a receiver for communication with various other devices over a transmission medium. The processor 800 may take charge of managing the bus architecture as well as general processing. The memory 820 may store therein data for the operation of the processor 800.

Preferably, the symbol rates for the layers of spatial data are different from each other.

Preferably, the processor 800 is further configured to determine the symbol rate for each layer of spatial data in accordance with an equivalent error probability criterion.

Preferably, the processor 800 is further configured to determine the symbol rate for each layer of spatial data through simulation in the case that a predetermined symbol rate constraint has been met.

Figure 9:
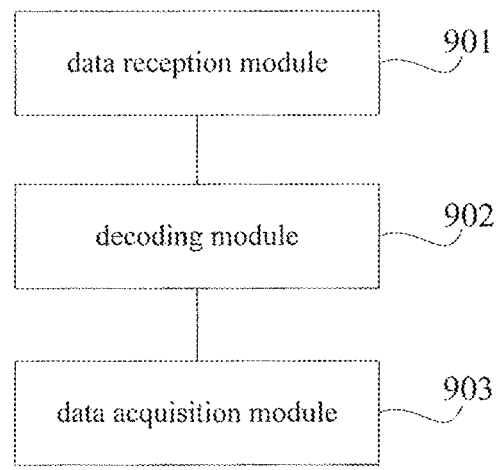
FIG. 9 is a schematic view showing another spatial layered transmission device according to one embodiment of the present disclosure.

Based on an identical inventive concept, the present disclosure further provides in some embodiments a spatial layered transmission device which, as shown in FIG. 9, includes: a data reception module 901 configured to receive layers of spatial data, a symbol rate for each layer of spatial data being set by a transmitting end so as to enable an error between SERs for the layers of spatial data to be smaller than a predetermined error threshold; a decoding module 902 configured to decode the layers of spatial data; and a data acquisition module 903 configured to acquire data transmitted from the transmitting end in accordance with the decoded layers of spatial data.

Preferably, the symbol rates for the layers of spatial data are different from each other.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

Figure 10:
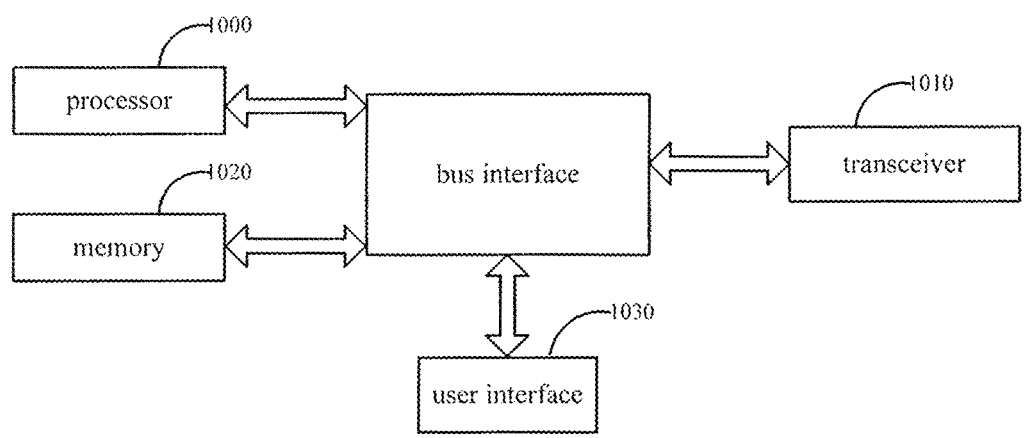
FIG. 10 is a schematic view showing a UE according to one embodiment of the present disclosure.

Based on an identical inventive concept, the present disclosure further provides in some embodiments a UE which, as shown in FIG. 10, includes a processor 1000, a memory 1020 and a transceiver 1010. The processor 1000 is configured to read a program stored in the memory 1020, so as to: receive layers of spatial data through the transceiver 1010, a symbol rate for each layer of spatial data being set by a transmitting end so as to enable an error between SERs for the layers of spatial data to be smaller than a predetermined error threshold, decode the layers of spatial data; and acquire data transmitted from the transmitting end in accordance with the decoded layers of spatial data. The transceiver 1010 is configured to receive and transmit data under the control of the processor 1000.

In FIG. 10, bus architecture may include a number of buses and bridges connected to each other, so as to connect various circuits for one or more processors such as the processor 1000, one or more memories such as the memory 1020 and etc. In addition, as is known in the art, the bus architecture may be used to connect various other circuits, such as a circuit for a peripheral device, a circuit for a voltage stabilizer and a power management circuit. Bus interfaces are provided, and the transceiver 1010 may consist of a plurality of elements, i.e., a transmitter and a receiver for communication with various other devices over a transmission medium. With respect to different UEs, a user interface 1030 may also be provided for devices which are to be arranged inside or outside the UE, and these devices may include but not limited to a keypad, a display, a speaker, a microphone and a joystick. The processor 1000 may take charge of managing the bus architecture as well as general processing. The memory 1020 may store therein data for the operation of the processor 1000.

Preferably, the symbol rates for the layers of spatial data are different from each other.

Preferably, the symbol rates for the layers of spatial data are determined in accordance with an equivalent error probability criterion.

Preferably, the symbol rates for the layers of spatial data are determined through simulation in the case that a predetermined symbol rate constraint has been met.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processing machine or any other programmable data processing device to create a machine, so that instructions executable by the processor of the computer or the other programmable data processing device may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further modifications and improvements without departing from the spirit of the present disclosure, and these modifications and improvements shall also fall within the scope of the present disclosure.

What is claimed is:

1. A spatial layered transmission method, comprising:
    dividing to-be-transmitted data into at least two layers of spatial data;
    determining a symbol rate for each layer of the at least two layers of spatial data, to enable an error between Symbol Error Rates (SERs) for the at least two layers of spatial data to be smaller than a predetermined error threshold; and
    encoding each layer of the at least two layers of spatial data in accordance with the determined symbol rate, and transmitting the encoded each layer of the at least two layers of spatial data,
    wherein determining the symbol rate for each layer of the at least two layers of spatial data comprises:
    determining the symbol rate for each layer of the at least two layers of spatial data in accordance with an equivalent error probability criterion that enables the SERs to be approximately equal to each other,
    wherein determining the symbol rate for each layer of the at least two layers of spatial data in accordance with the equivalent error probability criterion comprises:
    determining the symbol rate for each layer of the at least two layers of spatial data through simulation in the case that a predetermined symbol rate constraint has been met.

2. The spatial layered transmission method according to claim 1, wherein the symbol rates for the at least two layers of spatial data are different from each other.

3. A spatial layered transmission method, comprising:
receiving layers of spatial data, wherein a symbol rate for each of the layers of spatial data is set by a transmitting end, to enable an error between Symbol Error Rates (SERs) for the layers of spatial data to be smaller than a predetermined error threshold;
decoding the layers of spatial data; and
acquiring data transmitted from the transmitting end in accordance with the decoded layers of spatial data,
wherein the symbol rates for the layers of spatial data are determined in accordance with an equivalent error probability criterion that enables the SERs to be approximately equal to each other,
wherein the symbol rates for the layers of spatial data are determined through simulation in the case that a predetermined symbol rate constraint has been met.

4. The spatial layered transmission method according to claim 3, wherein the symbol rates for the layers of spatial data are different from each other.

5. A spatial layered transmission device, comprising:
a processor;
a memory connected to the processor via a bus interface and configured to store therein programs and data for the operation of the processor; and
a transceiver configured to receive and transmit data under control of the processor,
wherein in the case that the programs and data stored in the memory are called and executed by the processor, the processor is configured to
divide to-be-transmitted data into at least two layers of spatial data;
determine a symbol rate for each layer of the at least two layers of spatial data, to enable an error between Symbol Error Rates (SERs) for the at least two layers of spatial data to be smaller than a predetermined error threshold; and
encode each layer of the at least two layers of spatial data in accordance with the determined symbol rate, and transmit the encoded each layer of the at least two layers of spatial data,
wherein the processor is further configured to determine the symbol rate for each layer of the at least two layers of spatial data in accordance with an equivalent error probability criterion that enables the SERs to be approximately equal to each other,
wherein the processor is further configured to determine the symbol rate for each layer of the at least two layers of spatial data through simulation in the case that a predetermined symbol rate constraint has been met.

6. The spatial layered transmission device according to claim 5, wherein the symbol rates for the at least two layers of spatial data are different from each other.

7. A spatial layered transmission device, comprising:
a processor;
a memory connected to the processor via a bus interface and configured to store therein programs and data for the operation of the processor; and
a transceiver configured to receive and transmit data under control of the processor,
wherein in the case that the programs and data stored in the memory are called and executed by the processor, the processor is configured to
receive layers of spatial data, wherein a symbol rate for each of the layers of spatial data is set by a transmitting end, to enable an error between Symbol Error Rates (SERs) for the layers of spatial data to be smaller than a predetermined error threshold;
decode the layers of spatial data; and
acquire data transmitted from the transmitting end through the transceiver in accordance with the decoded layers of spatial data,
wherein the symbol rates for the layers of spatial data are determined in accordance with an equivalent error probability criterion that enables the SERs to be approximately equal to each other,
wherein the symbol rates for the layers of spatial data are determined through simulation in the case that a predetermined symbol rate constraint has been met.

8. The spatial layered transmission device according to claim 7, wherein the symbol rates for the layers of spatial data are different from each other.

* * * * *